(12) United States Patent  
Burleigh

(10) Patent No.: US 6,382,722 B2  
(45) Date of Patent: May 7, 2002

(54) CHILD SAFETY SEAT

(75) Inventor: David William Burleigh, Bognor Regis (GB)

(73) Assignee: Britax Excelsior Limited, Warwick (GB)

( * ) Notice: Subject to any disclaimer, the term of this patent is extended or adjusted under 35 U.S.C. 154(b) by 0 days.

(21) Appl. No.: 09/847,573

(22) Filed: May 2, 2001

(30) Foreign Application Priority Data

May 25, 2000 (GB) ............................................. 0012637

(51) Int. Cl.[7] ................................................. A47D 1/10
(52) U.S. Cl. ................................................... 297/250.1
(58) Field of Search ............................ 297/464, 250.1, 297/216.1

(56) References Cited

U.S. PATENT DOCUMENTS 3,992,056 A 11/1976 Koziatek et al.
4,685,740 A 8/1987 Fohl

FOREIGN PATENT DOCUMENTS

| EP | 0094318 | * 11/1983 |
| EP | 0 154 427 A2 | 9/1985 |
| EP | 0 326 265 A2 | 8/1989 |

* cited by examiner

Primary Examiner—Milton Nelson, Jr.
(74) Attorney, Agent, or Firm—Davis & Bujold, P.L.L.C.

(57) ABSTRACT

A child safety seat comprising a seat body having a seat portion, a seat back and vertically extending side walls projecting forwardly from the side edges of the seat back and upwardly from the side edges of the seat portion. The side walls have belt guide openings adjacent to the junction between the seat portion and the seat back for receiving the lap portion of a vehicle seat belt. Respective access slot extends from each belt guide opening to the edge of the corresponding side wall. A harness comprising shoulder straps is secured to the seat back. The seat body is adapted to deform so that the side walls of each access slot come into abutment with one another when a force is applied to the seat back in a direction to bend it towards the seat portion.

18 Claims, 6 Drawing Sheets

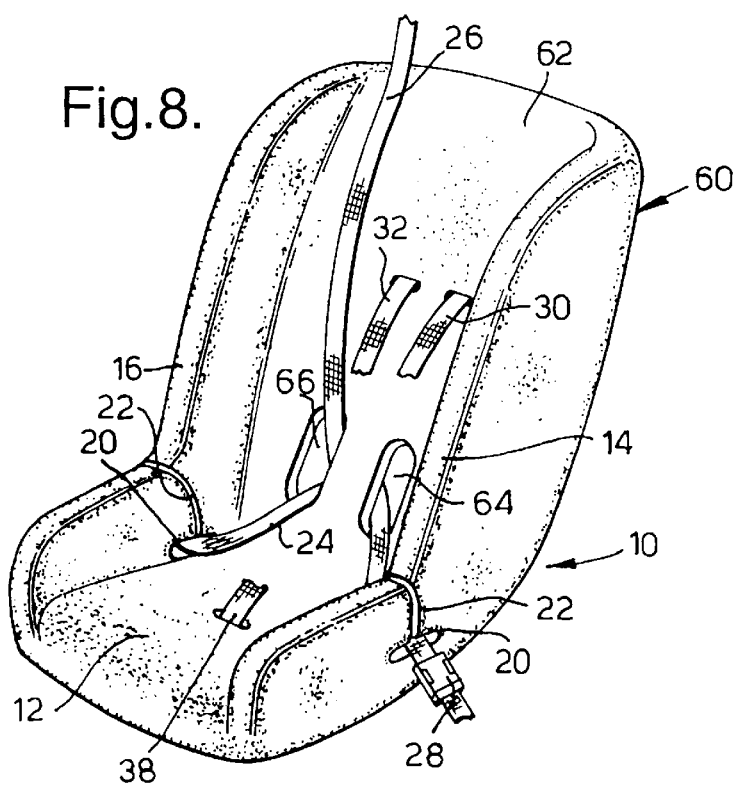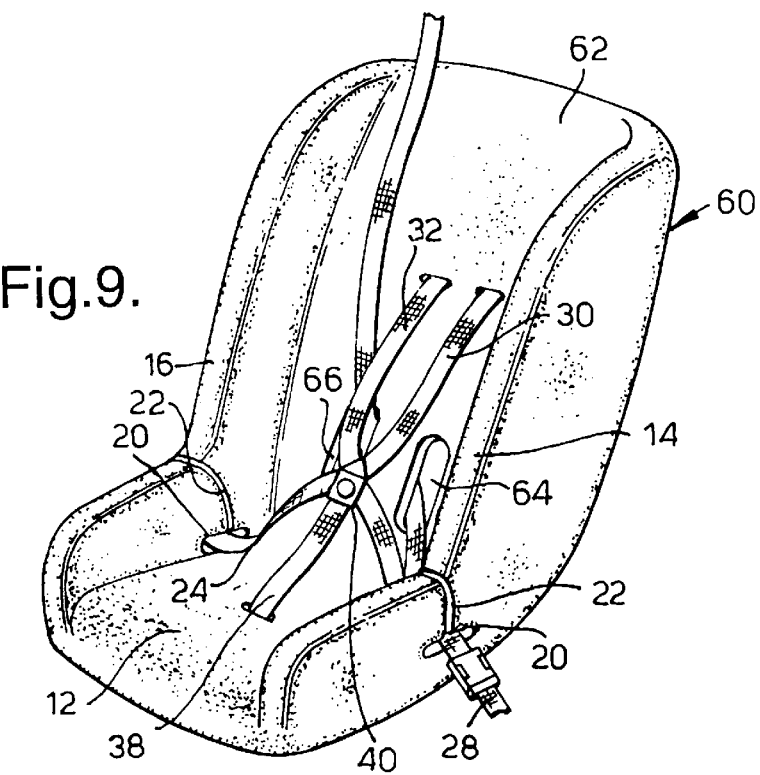

CHILD SAFETY SEAT

FIELD

This invention relates to a child safety seat of the type comprising a seat body having a seat portion, a seat back and vertically extending side walls projecting forwardly from the side edges of the seat back and upwardly from the side edges of the seat portion at least in the region of the junction between the seat portion and the seat back, the side walls having belt guide openings adjacent to the junction between the seat portion and the seat back for receiving the lap portion of a vehicle seat belt by which the child seat may be secured in place on a vehicle seat, and a harness comprising shoulder straps secured to the seat back.

RELATED ART

A child seat of this type is disclosed in U.S. Pat. No. 3,992,056. The openings for receiving the lap belt are in the form of closed apertures through which the belt has to be threaded. To simplify installation, it has been proposed to replace such openings by open-sided recesses. However, when such a seat is involved in an accident, the shoulder straps of the child harness apply a load to the seat back which tends to bend it forwards relative to the seat portion. Such recesses constitute a point of weakness where this bending force is concentrated. Accordingly, it is necessary to reinforce this region of the seat body thus increasing its overall weight. It is an object of the invention to provide a child seat of the type described above in which such reinforcement is unnecessary.

SUMMARY OF THE INVENTION

According to the invention, in a child seat of the type described above, characterised in that a respective access slot extends from each belt guide opening to the edge of the corresponding side wall and the seat body is adapted to deform so that the side walls of each access slot come into abutment with one another when a force is applied to the seat back in a direction to bend it towards the seat portion.

BRIEF DESCRIPTION OF THE DRAWINGS

FIGS. 8 and 9 are perspective views, corresponding to FIGS. 3 and 4, of a child seat having an alternative routing for the vehicle seat belt;

DETAILED DESCRIPTION OF THE PREFERRED EMBODIMENT

Figure 1:
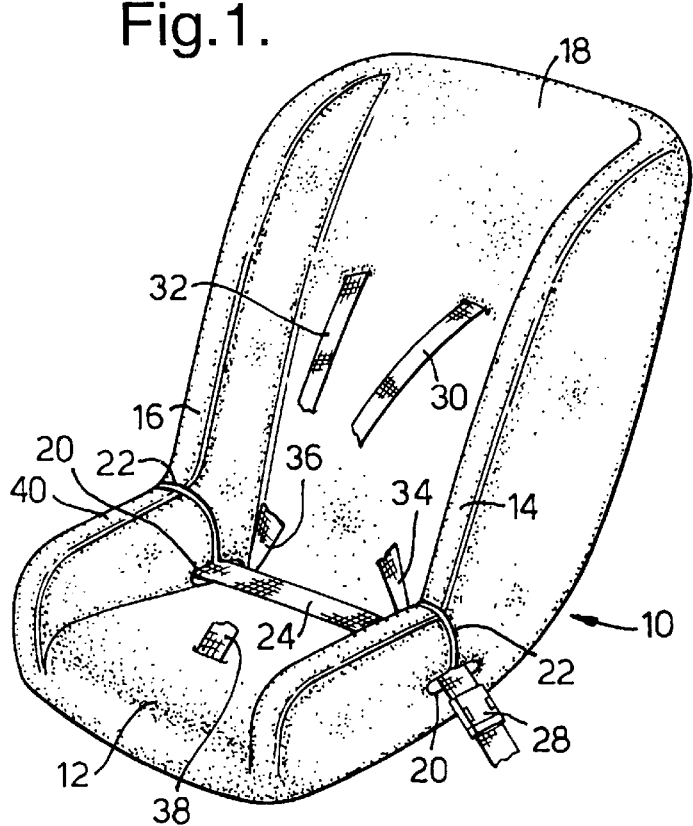
FIG. 1 is a perspective view of a child seat in accordance with the invention held in place by a two-point vehicle seat belt, with its child harness partly broken away.
Figure 2:
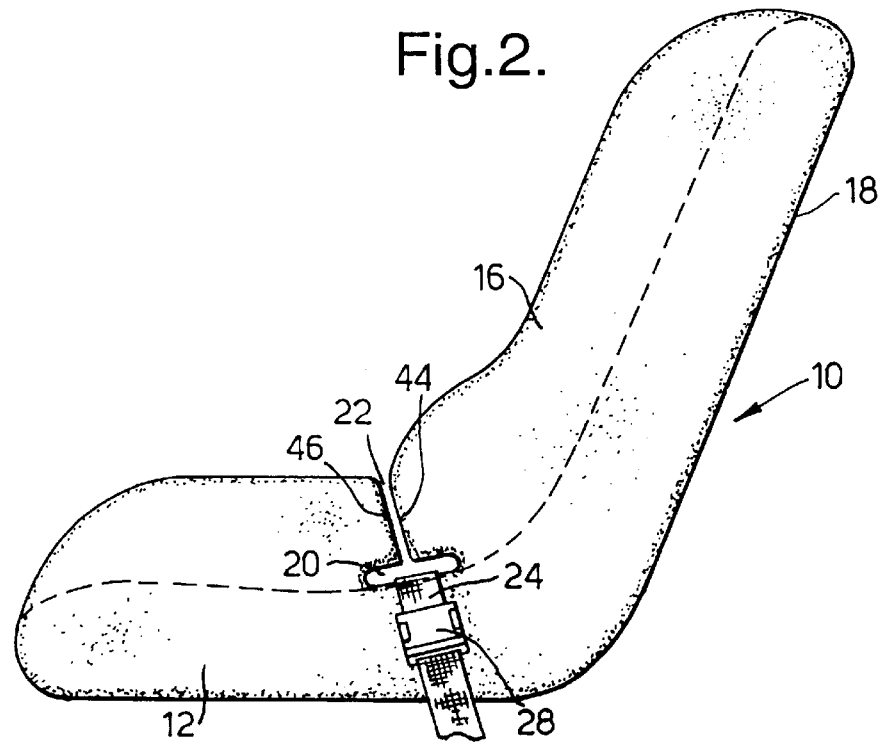
FIG. 2 is a side view of the seat shown in FIG. 1, in its normal condition.

Referring to FIGS. 1 and 2, a child safety seat comprises a seat body 10 having a seat portion 12, side walls 14 and 16 and a seat back 18. At the junction between the seat portion 12 and the seat back 18, each side wall 14, 16 has a belt guide in the form of an elongate opening 20 with a generally vertical slot 22 extending from the opening 20 to the edge of the corresponding side wall 14, 16. When the seat 10 is to be secured on a vehicle seat using a two-point vehicle seat belt, the lap belt 24 is passed down through the slot 22 into the openings 20 and the buckle 28 fastened. A child occupant of the seat body 10 sits on top of the lap belt 24.

Figure 3:
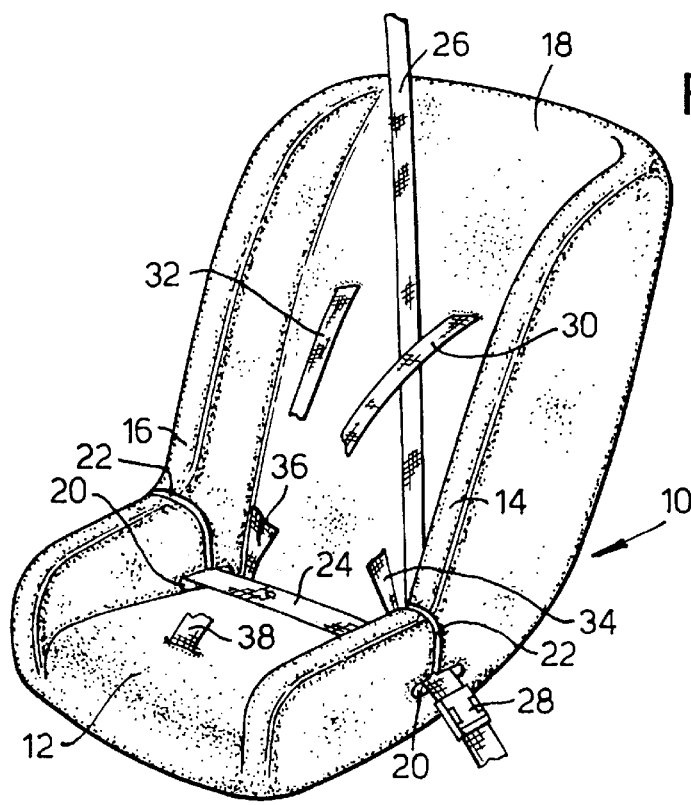
FIG. 3 is a perspective view of the child seat shown in FIGS. 1 and 2, but held in place by a three-point vehicle seat belt, with its five-point child harness partly broken away.

FIG. 3 shows the seat body 10 of FIGS. 1 and 2 secured by a three-point vehicle seat belt having a lap strap 24 and a diagonal shoulder strap 26 secured by the buckle 28. The child occupant sits on top of the lap strap 24 with the shoulder belt between his/her back and the seat back 18.

Figure 4:
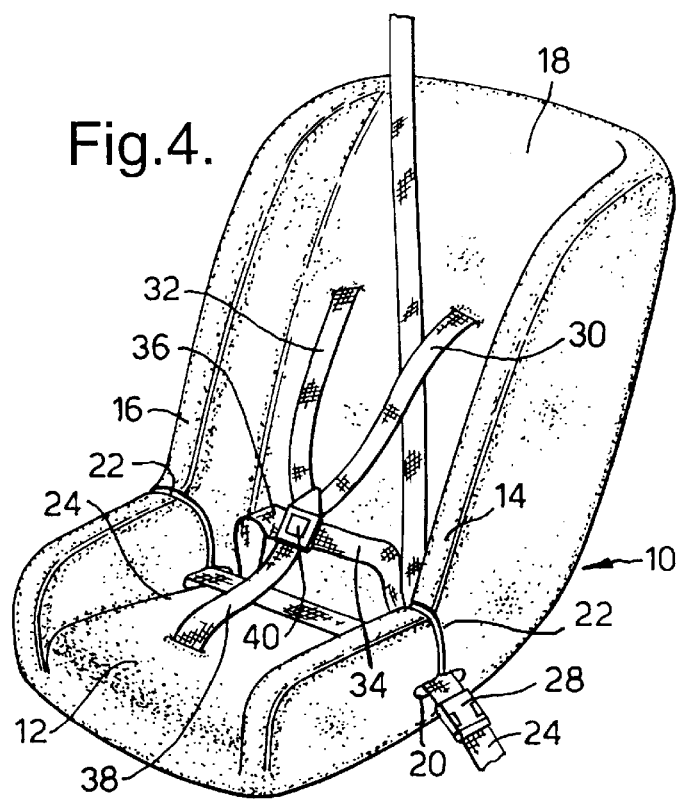
FIG. 4 is a perspective view of corresponding to FIG. 3 but with the child harness complete.
Figure 5:
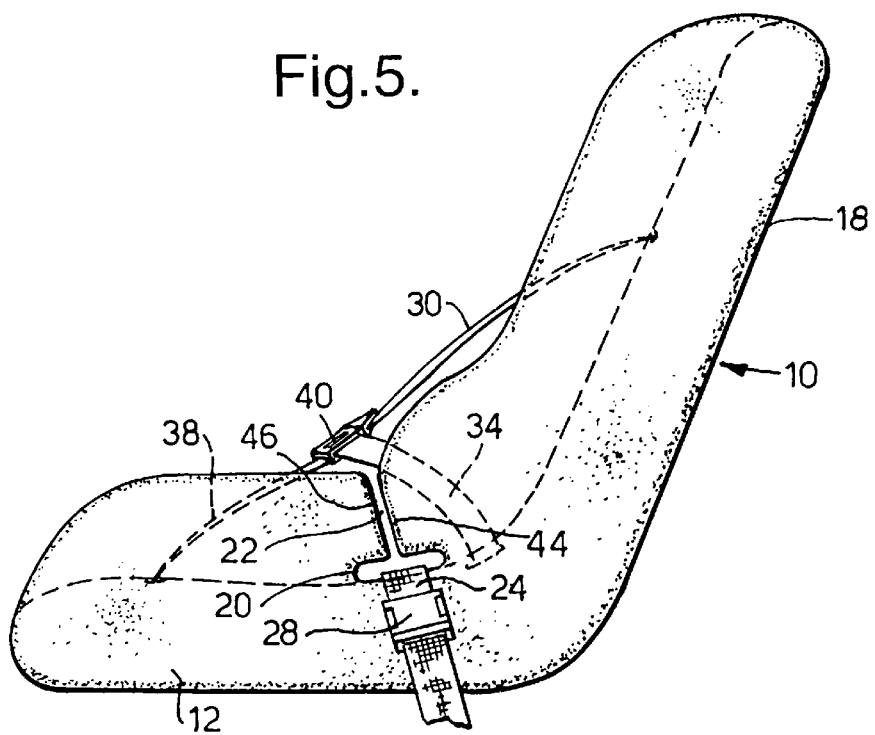
FIG. 5 is a side view of the set shown in FIG. 4.

As can best be seen in FIGS. 4 and 5, the child seat 10 is provided with a harness comprising shoulder straps 30 and 32 secured to the seat back 18, together with lap straps 34 and 36 and a crutch strap 38 which are secured to the seat portion 12. Usually, each shoulder strap lap 30, 32 will be formed in one piece with the corresponding lap strap 34, 36. The child harness is secured by a buckle 40.

Figure 6:
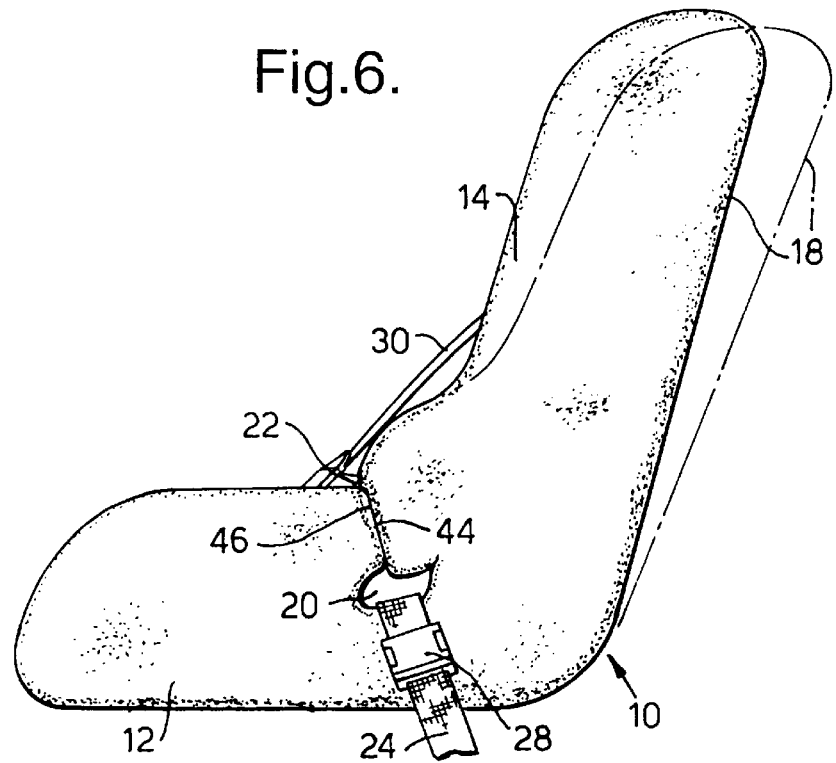
FIG. 6 is a side view, similar to FIG. 2, but showing the result of application of a forward load to the seat back.

Referring to FIG. 6, in the event of sudden deceleration causing movement of the torso of a child occupant away from the seat back 18, the resulting force exerted by shoulder straps 30 and 32 on the seat back 18 causes the seat body 10 to bend round the orientation shown in chain-dotted lines to the orientation shown in solid lines. As a result, the slot 22 closes up so that force can then be transmitted directly from the rear side wall 44 of the slot 22 to the front side wall 46 thereof, thereby resisting further bending of the seat body 10.

Figure 7:
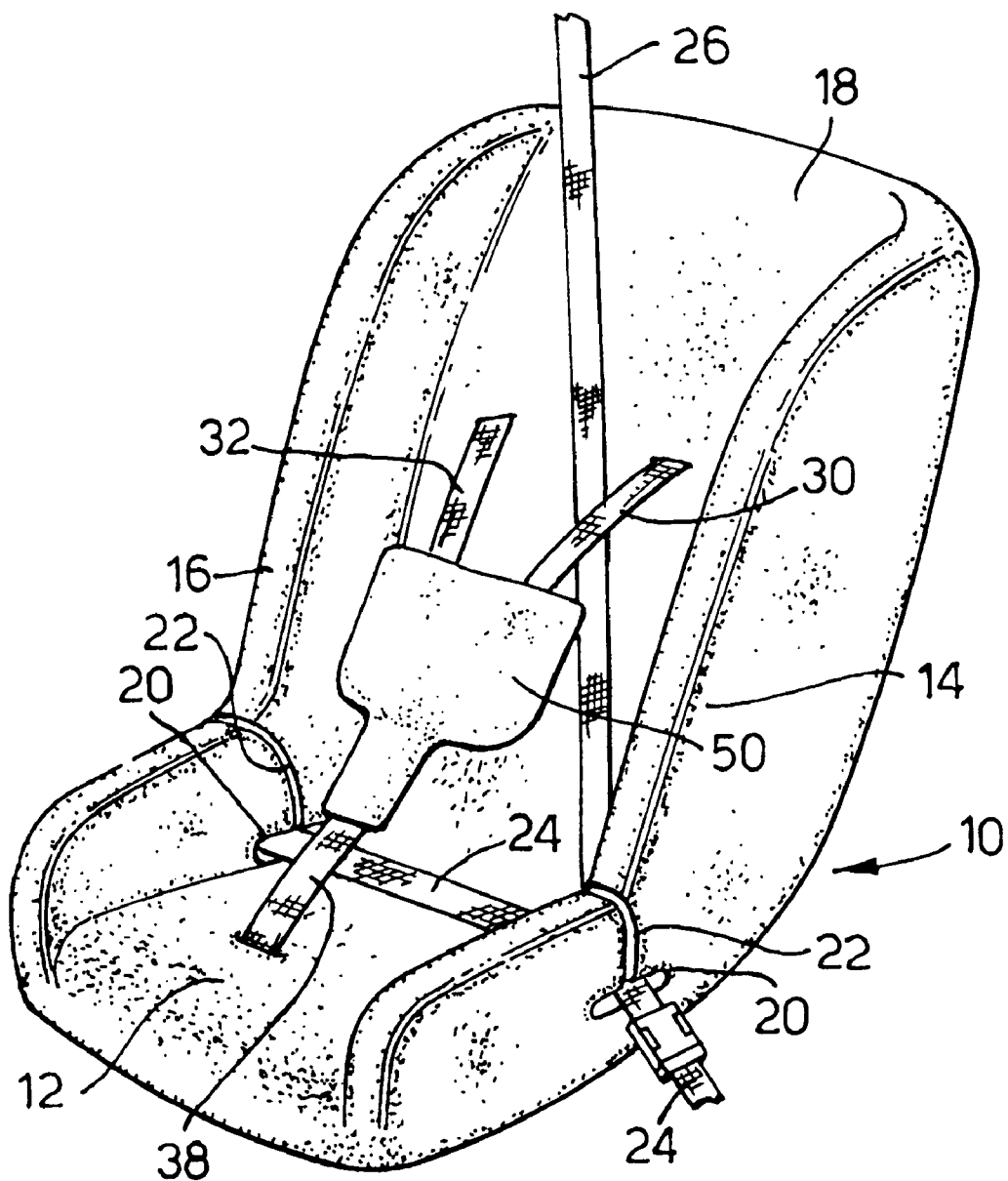
FIG. 7 is a perspective view of the child seat shown in FIG. 4 with a T-shield replacing the five-point child harness.

FIG. 7 shows the seat body 10 provided with a so-called T-shield 50 connecting the shoulder straps 30 and 32 to the crutch strap 38. This type of child harness does not have lap straps.

FIGS. 8 and 9 show a child seat having a seat body 60 similar to the seat body 10 shown in FIGS. 1 to 7 except that its seat back 62 has two openings 64 and 66 adjacent to but separated from the elongate openings 22 in the side walls 14 and 16. The lap strap 24 and the shoulder strap 26 of the vehicle seat belt are threaded through these openings so as to be held in abutment with the seat back 62. Other parts of the seat body 60 and the child harness are denoted by the same reference numerals as the corresponding parts of the seat shown in FIGS. 3 and 4 and will not be described in detail.

Figure 10:
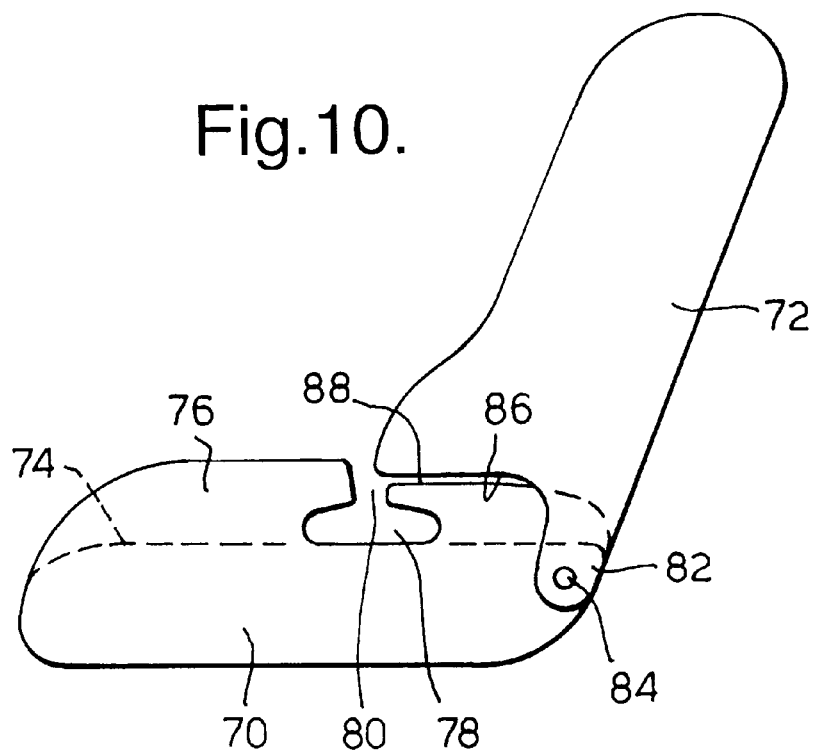
FIG. 10 is a side view of another child seat in accordance with the invention, having a removable seat back.

FIG. 10 shows a child seat comprising a base 70 and a detachable seat back 72. The base 70 includes a seat surface 74 and two side walls 76, each of which has an opening 78 with a vertical slot 80 extending to the top of the corresponding side wall 76, similar to the openings 20 and slots 22 of FIGS. 1–8. The base 70 is secured on a vehicle seat by at least the lap strap of a vehicle seat belt which is located in the openings 78.

The seat back 72 has downwardly extending legs 82 projecting on each side of the rear ends of the side walls 76 and having a hole for receiving a bolt 84 by which the seat back 72 is secured to the base 70. Shoulder straps of a child harness (not shown) are secured to the seat back 72. When a load is applied to these shoulder straps, the resulting force is transmitted from the bottom edges 86 of the side walls of the seat back 72 to the top edges 88 of the side walls 76 behind the slots 80. If the force is sufficient, the slots 80 tend to close up in a similar manner to the slots 22, as shown in FIG. 6. When the seat back 72 is removed, the base 70 can serve as a booster seat.

Figure 11:
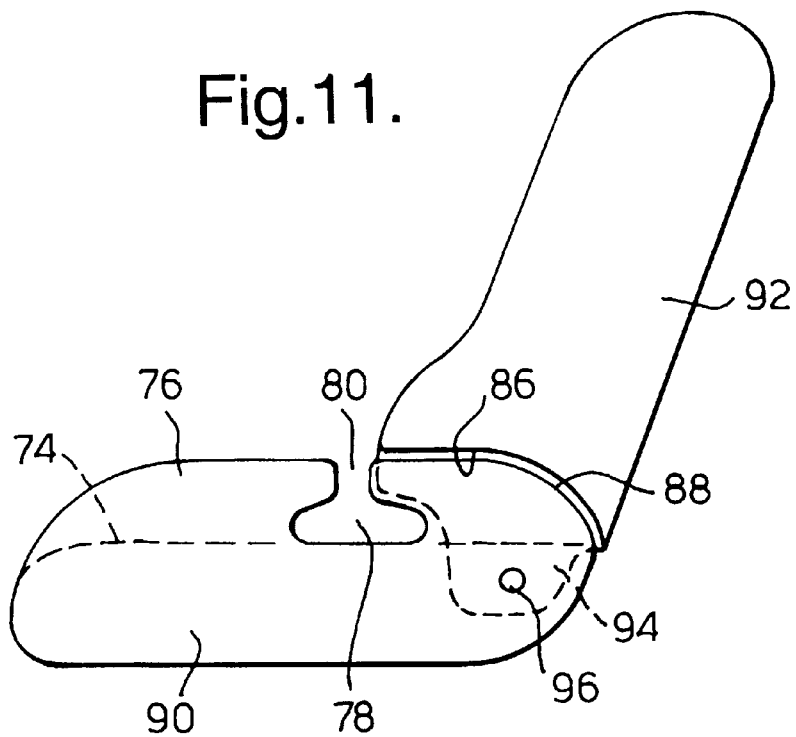
FIG. 11 is a side view of another child seat similar to the seat shown if FIG. 10 but having a different arrangement for attaching the removable seat back.

FIG. 11 illustrates a variant of the seat shown in FIG. 10 having a base 90 and a seat back 92. In contrast to FIG. 10, the seat back 92 has downwardly extending legs 94 which project inside the side walls 76 and into slots in the seat surface 74 of the base portion 90 where they are secured by a bolt 96. Other parts of the seat shown in FIG. 11 are denoted by the same reference numerals as the corresponding parts of the seat shown in FIG. 10 and will not be described in detail.

When any of the child seats shown in the drawings is used by a larger child without the harness 32, 36, 38, such a child is restrained in the seat by the vehicle seat belt as described in EP-A-0326265.

What is claimed is:

1. A child safety seat comprising
    a seat body having a seat portion a seat back and a junction region between the seat portion and the seat back,
    vertically extending side walls projecting forwardly from the side edges of the seat back and upwardly from the side edges of the seat portion at least in said junction region, each side wall having a belt guide opening adjacent to said junction region for receiving a lap portion of a vehicle seat belt by which the child seat may be secured in place on a vehicle seat and an access slot extending from each belt guide opening to the edge of the side wall, and
    a harness comprising shoulder straps secured to the seat back, the seat body being adapted to deform so that the side walls of each access slot come into abutment with one another when a force is applied to the seat back in a direction to bend it towards the seat portion.

2. A child safety seat according to claim 1, wherein the side walls extend from the top of the seat back to the front edge of the seat portion.

3. A child safety seat according to claim 2, wherein the seat back is pivotally attached to the seat portion by a transverse pivot axle located behind the access slots, and forward angular movement of the seat back is restricted by abutment of the bottom edges of the seat back with the top edges of the side walls behind the slots.

4. A child safety seat according to claim 2, wherein each belt guide opening is wider than the corresponding access slot.

5. A child safety seat according to claim 4, wherein the seat back has a pair of openings for receiving a shoulder strap of a vehicle seat belt.

6. A child safety seat according to claim 4, wherein the seat back is pivotally attached to the seat portion by a transverse pivot axle located behind the access slots, and forward angular movement of the seat back is restricted by abutment of the bottom edges of the seat back with the top edges of the side walls behind the slots.

7. A child safety seat according to claim 4, wherein each belt guide opening is bounded by two end walls and two side walls which are substantially longer than said end walls, and the access slot opens through one of said side walls at a location spaced from the end walls.

8. A child safety seat according to claim 7, wherein the seat back has a pair of openings for receiving a shoulder strap of a vehicle seat belt.

9. A child safety seat according to claim 7, wherein the seat back is pivotally attached to the seat portion by a transverse pivot axle located behind the access slots, and forward angular movement of the seat back is restricted by abutment of the bottom edges of the seat back with the top edges of the side walls behind the slots.

10. A child safety seat according to claim 1, wherein each belt guide opening is wider than the corresponding access slot.

11. A child safety seat according to claim 10, wherein the seat back is pivotally attached to the seat portion by a transverse pivot axle located behind the access slots, and forward angular movement of the seat back is restricted by abutment of the bottom edges of the seat back with the top edges of the side walls behind the slots.

12. A child safety seat according to claim 10, wherein the seat back has a pair of openings for receiving a shoulder strap of a vehicle seat belt.

13. A child safety seat according to claim 10, wherein each belt guide opening is bounded by two end walls and two side walls which are substantially longer than said end walls, and the access slot opens through one of said side walls at a location spaced from the end walls.

14. A child safety seat according to claim 13, wherein the seat back is pivotally attached to the seat portion by a transverse pivot axle located behind the access slots, and forward angular movement of the seat back is restricted by abutment of the bottom edges of the seat back with the top edges of the side walls behind the slots.

15. A child safety seat according to claim 13, wherein the seat back has a pair of openings for receiving a shoulder strap of a vehicle seat belt.

16. A child safety seat according to claim 15, wherein the seat back is pivotally attached to the seat portion by a transverse pivot axle located behind the access slots, and forward angular movement of the seat back is restricted by abutment of the bottom edges of the seat back with the top edges of the side walls behind the slots.

17. A child safety seat according to claim 1, wherein the seat back has a pair of openings for receiving a shoulder strap of a vehicle seat belt.

18. A child safety seat according to claim 1, wherein the seat back is pivotally attached to the seat portion by a transverse pivot axle located behind the access slots, and forward angular movement of the seat back is restricted by abutment of the bottom edges of the seat back with the top edges of the side walls behind the slots.

* * * * *